US010459965B2

(12) United States Patent
Zhao et al.

(10) Patent No.: US 10,459,965 B2
(45) Date of Patent: Oct. 29, 2019

(54) METHOD AND APPARATUS FOR DISPLAYING IMAGES

(71) Applicant: Samsung Electronics Co., Ltd., Suwon-si, Gyeonggi-do (KR)

(72) Inventors: Haibin Zhao, Beijing (CN); Yuanyou Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 15/036,242

(22) PCT Filed: Dec. 2, 2014

(86) PCT No.: PCT/KR2014/011726
§ 371 (c)(1),
(2) Date: May 12, 2016

(87) PCT Pub. No.: WO2015/084034
PCT Pub. Date: Jun. 11, 2015

(65) Prior Publication Data
US 2016/0299893 A1    Oct. 13, 2016

(30) Foreign Application Priority Data

Dec. 2, 2013 (CN) .......................... 2013 1 0637189

(51) Int. Cl.
*G06F 16/51* (2019.01)
*G06F 16/00* (2019.01)
(Continued)

(52) U.S. Cl.
CPC ................ *G06F 16/51* (2019.01); *G06F 3/03* (2013.01); *G06F 3/0482* (2013.01); *G06F 3/04842* (2013.01); *G06F 3/04845* (2013.01); *G06F 3/04883* (2013.01); *G06F 3/14* (2013.01); *G06F 16/00* (2019.01); *G06K 9/2081* (2013.01); *G06K 9/6215* (2013.01); *G09G 2354/00* (2013.01)

(58) Field of Classification Search
CPC ................ G06K 9/6215; G06K 9/2081; G06F 17/3028; G06F 3/0482; G06F 3/04883; G06F 3/03; G06F 3/14; G06F 3/04845
USPC ........................................................ 382/218
See application file for complete search history.

(56) References Cited

U.S. PATENT DOCUMENTS 8,543,940 B2    9/2013   Singhal et al.
8,577,210 B2   11/2013   Kashima
(Continued)

FOREIGN PATENT DOCUMENTS

CN        1940921 A     4/2007
CN      101576932 A    11/2009
(Continued)

*Primary Examiner* — Ruiping Li
(74) *Attorney, Agent, or Firm* — Jefferson IP Law, LLP

(57) ABSTRACT

A method of displaying an image performed by a device includes generating a display image with respect to each of a plurality of image groups in the device; selecting one of the plurality of image groups in the device based on a user input; searching for the display image that matches the selected image group; and displaying the found display image, wherein the found display image comprises a preview image that matches each of a plurality of images included in the selected image group.

17 Claims, 10 Drawing Sheets

(51) Int. Cl.
*G06F 3/14* (2006.01)
*G06F 3/03* (2006.01)
*G06F 3/0484* (2013.01)
*G06F 3/0482* (2013.01)
*G06F 3/0488* (2013.01)
*G06K 9/20* (2006.01)
*G06K 9/62* (2006.01)

(56) References Cited

U.S. PATENT DOCUMENTS

| | | | |
|---|---|---|---|
| 2006/0080719 A1* | 4/2006 | Minatogawa | H04N 1/00127 725/105 |
| 2008/0176602 A1* | 7/2008 | Kim | H04M 1/27455 455/564 |
| 2011/0026901 A1 | 2/2011 | Kashima | |
| 2011/0153602 A1* | 6/2011 | Kiddle | G06F 17/30029 707/731 |
| 2013/0198176 A1 | 8/2013 | Kim | |
| 2014/0126813 A1 | 5/2014 | Jia | |
| 2014/0136566 A1 | 5/2014 | Kim et al. | |

FOREIGN PATENT DOCUMENTS

| | | |
|---|---|---|
| CN | 101710267 A | 5/2010 |
| CN | 102819397 A | 12/2012 |
| CN | 103092946 A | 5/2013 |
| CN | 103164504 A | 6/2013 |
| KR | 10-2007-0089337 A | 8/2007 |
| KR | 10-2011-0054203 A | 5/2011 |
| KR | 10-1191172 B1 | 10/2012 |
| KR | 10-2013-0107177 A | 10/2013 |

* cited by examiner

FIG. 5B

| INDEX | IMAGE FILE PATH | PREVIEW IMAGE LOCATION | RADIUS |
|---|---|---|---|
| 1 | /sdcard/images/1.jpg | (a, b) | t |
| 2 | /sdcard/images/2.jpg | (c, d) | u |
| 3 | /sdcard/images/3.jpg | (e, f) | y |
| ⋮ | ⋮ | ⋮ | ⋮ |

METHOD AND APPARATUS FOR DISPLAYING IMAGES

TECHNICAL FIELD

The present invention relates to a method and apparatus for displaying images included in an image group selected by a device.

BACKGROUND ART

As the capability of a device has been developed, users of the device may use devices to deal with a large quantity of images. Users of the device may use a camera module to obtain the large quantity of images and store them in the device or to obtain the large quantity of images from an external device and store them in the device.

As the number of images dealt with by the device increases, there is an increased interest in a method in which users of the device easily deal with images stored in the device. Therefore, a technology of efficiently displaying images in a device is required.

DETAILED DESCRIPTION OF THE INVENTION

Technical Problem

The present invention provides an interface by which images stored in a device may be efficiently displayed on a screen and users of the device may efficiently process the images stored in the device.

Technical Solution

A method of displaying an image performed by a device includes generating a display image with respect to each of a plurality of image groups in the device; selecting one of the plurality of image groups in the device based on a user input; searching for the display image that matches the selected image group; and displaying the found display image, wherein the found display image comprises a preview image that matches each of a plurality of images included in the selected image group.

Advantageous Effects of the Invention

According to the present invention described above, images stored in a device may be effectively displayed. The device may search for a display image with respect to a selected image group and may display the found display image, thereby efficiently showing the images stored in the device to users of the device. The users may use a preview image included in the display image displayed on the device to efficiently manage the images stored in the device.

DESCRIPTION OF THE DRAWINGS

FIGS. 5A and 5B are diagrams for describing a method in which a device matches a location of a preview image in a display image and a file path of an image that matches the preview image and generates image matching information, according to an embodiment of the present disclosure.

BEST MODE

Figure 1:
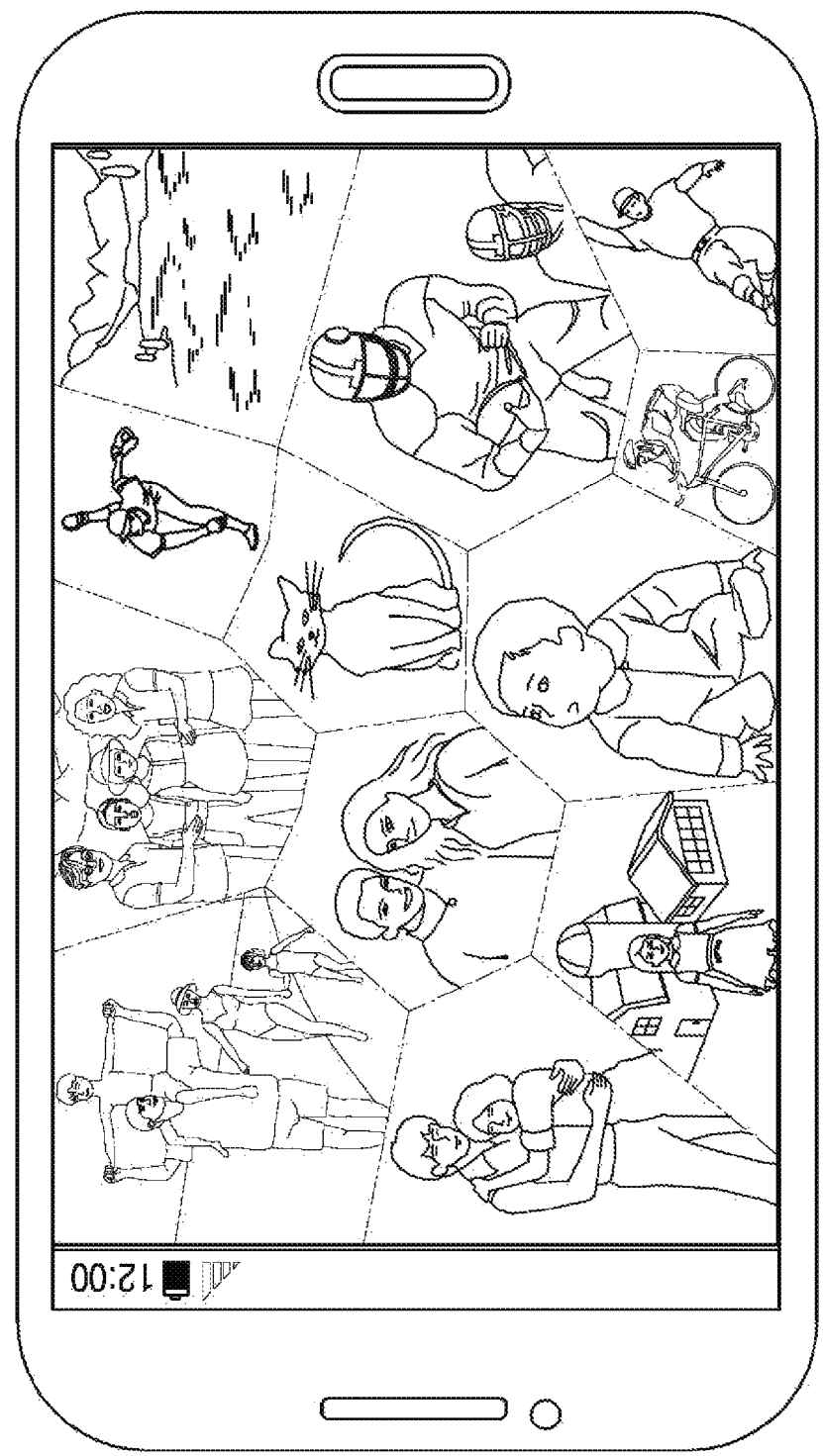
FIG. 1 is a schematic diagram illustrating a method in which a device displays an image group, according to an embodiment of the present disclosure.

According to an aspect according to the present invention, there is provided a method of displaying an image performed by a device including generating a display image with respect to each of a plurality of image groups in the device; selecting one of the plurality of image groups in the device based on a user input; searching for the display image that matches the selected image group; and displaying the found display image, wherein the found display image includes a preview image that matches each of a plurality of images included in the selected image group.

The generating of the display image may include: generating a preview image that matches each of a plurality of images included in the plurality of image groups; generating the display image by disposing the generated preview image based on a preset rule; and generating image matching information by matching a location of the disposed preview image in the display image with an image file path of an image that matches the generated preview image.

The generating of the display image by disposing the generated preview image based on the preset rule may include disposing an image having a relatively high importance among the plurality of images in a region having a relatively big size among a plurality of split regions of the display image based on importance information set to the plurality of images.

The generating of the preview image may include determining an important region of each of the plurality of images with respect to each of the plurality of images; and generating the preview image by processing the plurality of images in relation to the determined important region.

The method may further include selecting the preview image included in the displayed display image based on a user input; performing a function provided by the device on an image that matches the selected preview image based on the user input; and correcting the display image by reflecting a result of performing the function and displaying the corrected display image.

The performing of the function provided by the device may include using image matching information included in the device.

The searching for the display image may include when the display image that matches the selected image group is not found, generating a display image with respect to the selected image group, and the displaying of the display image may include displaying the generated display image.

According to another aspect according to the present invention, there is provided a device including a controller for generating a display image with respect to each of a plurality of image groups in the device, selecting one of the plurality of image groups in the device based on a user input, and searching for the display image that matches the selected image group; an input interface for receiving a user input; and a display for displaying the found display image, wherein the found display image includes a preview image that matches each of a plurality of images included in the selected image group.

The controller may generate a preview image that matches each of a plurality of images included in the plurality of image groups, generate the display image by disposing the generated preview image based on a preset rule, and generate image matching information by matching a location of the disposed preview image in the display image with an image the path of an image that matches the generated preview image.

The controller may dispose an image having a relatively high importance among the plurality of images in a region having a relatively big size among a plurality of split regions of the display image based on importance information set to the plurality of images.

The controller may determine an important region of each of the plurality of images with respect to each of the plurality of images and generate the preview image by processing the plurality of images in relation to the determined important region.

The controller may select the preview image included in the displayed display image based on the user input received from the input interface, perform a function provided by the device on an image that matches the selected preview image based on a user input, and correct the display image by reflecting a result of performing the function, and wherein the display displays the corrected display image.

The controller may use image matching information included in the device.

When the display image that matches the selected image group is not found, the controller may generate a display image with respect to the selected image group, and the display may display the generated display image.

MODE OF THE INVENTION

The embodiments will now be described more fully with reference to the accompanying drawings for those of ordinary skill in the art to be able to perform the present invention without any difficulty. The invention may, however, be embodied in many different forms and should not be construed as being limited to the embodiments set forth herein; rather, these embodiments are provided so that this disclosure will be thorough and complete, and will fully convey the concept of the invention to those of ordinary skill in the art. Also, parts in the drawings unrelated to the detailed description are omitted to ensure clarity of the present invention. Like reference numerals in the drawings denote like elements, and thus their description will not be repeated.

Throughout the specification, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

The present invention will be described in detail with reference to the accompanying drawings.

In the present specification, a device 100 means an apparatus capable of displaying an image. For example, the device 100 may include a cellular phone, a TV, a tablet PC, a wearable device having a display screen, etc. but is not limited thereto.

FIG. 1 is a schematic diagram illustrating a method in which a device displays an image group, according to an embodiment of the present disclosure.

The device 100 may obtain a plurality of images. The device 100 may also generate the image group. The device 100 may classify a plurality of images by using various references to generate a plurality of image groups.

The device 100 may split a screen of the device 100 into a plurality of regions in order to generate a display image. For example, the device 100 may split the screen of the device 100 into the plurality of regions in a collage form. The device 100 may also generate a preview image with respect to each of the plurality of images included in the image group and may dispose the generated preview images on the plurality of split screens to generate the display image.

The device 100 may select one of the plurality of image groups based on a user input. The device 100 may search for a display image that matches the selected image group and may display the found display image.

When the device 100 fails to find the display image that matches the selected image group, the device 100 may generate a display image with respect to the selected image group.

Figure 2:
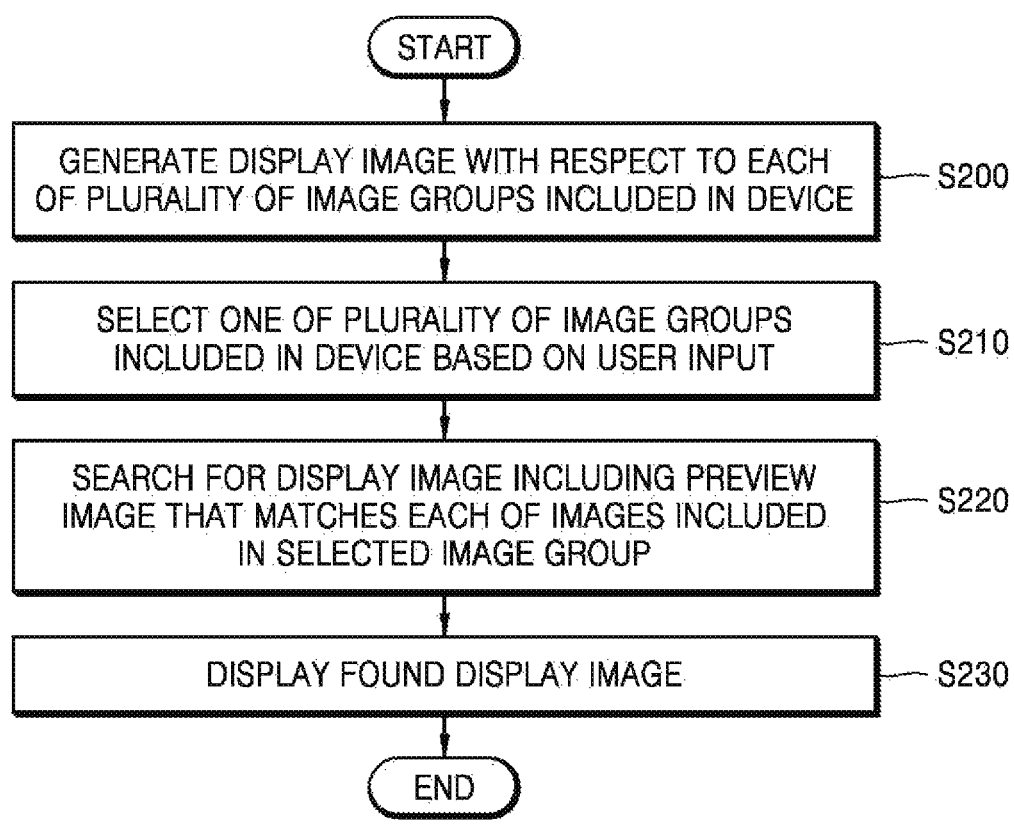
FIG. 2 is a flowchart for describing a method in which a device displays an image group, according to an embodiment of the present disclosure.

FIG. 2 is a flowchart for describing a method in which a device displays an image group, according to an embodiment of the present disclosure.

In operation S200, the device 100 may generate a display image with respect to each of a plurality of image groups in the device 100.

The device 100 may obtain a plurality of images. For example, the device 100 may obtain an image from an external device and may obtain an image from a camera module included in the device 100 but is not limited thereto. The device 100 may obtain an image by using various methods.

The device 100 may generate the image group. The device 100 may group the plurality of images by using various references to generate a plurality of image groups. For example, the device 100 may group images based on a time when the images are obtained. The device 100 may also group the images based on a user input, sources of the images, capacity of the images, a preset rule, or a combination of these but is not limited thereto.

The device 100 may generate a preview image with respect to each of a plurality of images included in the image group. For example, the device 100 may generate the preview image by capturing a main part of an image. The device 100 may also generate the preview image by reducing a pixel number of the image but is not limited thereto. The device 100 may generate the preview image by using various methods.

The device 100 may split a screen of the device 100 into a plurality of regions to generate a display image. For example, the device 100 may use a triangle, a square, a circle, or a pentagon to split the screen of the device 100 into the plurality of regions but is not limited thereto.

The device 100 may use a combination of polygons to split the screen of the device 100 into the plurality of regions. For example, the device 100 may use a combination of a square and a triangle to split the screen of the device 100 into the plurality of regions.

The device 100 may also split the screen of the device 100 into the plurality of regions in various shapes. For example, the device 100 may split the screen of the device 100 into the plurality of regions in a collage form.

The device 100 may dispose a preview image generated with respect to each of the split screens to generate the display image. For example, when X images are included in the image group, the device 100 may split the screen into X regions and may match the preview image with respect to each image included in the image group with the split region to generate the display image. The device 100 may store the generated display image.

When the device 100 generates the display image, the device 100 may generate image matching information of the display image. The image matching information means information generated by matching a location of a preview image included in the display image with a storage path of images that match the preview image. For example, the device 100 may match a location of a first preview image included in the display image with a path of storing a first image. For example, when the location of the first preview image included in the display image is (X, Y), the device 100 may generate the image matching information by using (X, Y) and a storage path (/sdcard/images/1.jpg) of the first image.

The device 100 may generate a plurality of display images with respect to one image group. For example, the device 100 may generate the plurality of display images with respect to one image group based on the number of images included in the image group. For example, when the number of images included in the image group is greater than a preset threshold value, the device 100 may generate the plurality of display images with respect to one image group. The threshold value may be set by a user input, a preset rule, or an application installed in the device 100 but is not limited thereto. The threshold value may be set using various methods.

The device 100 may periodically correct or generate the display image with respect to the image group in the device 100. For example, the device 100 may correct or generate the display image based on time information set by a user, preset time information, or time information received from an external device.

For example, when the user sets 24 hours, the device 100 may collect information regarding the plurality of images included in the image group in the device 100 every 24 hours to correct or generate the display image.

In operation S210, the device 100 may select one of the plurality of image groups in the device 100 based on a user input.

The device 100 may receive the user input. For example, the device 100 may receive the user input through a touch screen but is not limited thereto.

The device 100 may select one of the plurality of image groups based on the user input. For example, the device 100 may display an icon indicating the plurality of image groups and may select one of the plurality of displayed image groups based on the user input.

In operation S220, the device 100 may search for a display image including a preview image that matches each of the images included in the selected image group.

The device 100 may search for the display image that matches the selected image group. For example, the device 100 may search for the display image that matches the selected image group among display images in the device 100.

When the device 100 fails to find the display image that matches the selected image group, the device 100 may generate the display image with respect to the selected image group. For example, when there is no display image corresponding to the selected image group, the device 100 may generate the display image in operation S210 or by using the method described with reference to FIG. 3.

In operation S230, the device 100 may display the found display image.

When the device 100 succeeds in finding the display image with respect to the selected image group, the device 100 may display the found display image. When the device 100 fails to find the display image with respect to the selected image group, the device 100 may generate the display image with respect to the selected image group and may display the generated display image.

The device 100 may select at least one preview image included in the display image based on a user input. For example, the device 100 may receive a tap input of the user and may select a preview image that matches a location of the tap input received in the display image. A tap indicates an operation where the user very quickly touches a screen by using a finger or a touch stylus pen. That is, the tap means a case where a very short time difference between a touch-in time when the finger or the touch stylus pen touches a screen and a touch-out time when the finger or the touch stylus pen detaches from the screen is smaller than a threshold time.

The device 100 may correct the display image based on the user input and may display the corrected display image. For example, when the user selects the first preview image and moves the selected first preview image to a second preview image by performing a drag input, the device 100 may correct the display image to exchange locations of the first preview image and the second preview image in the display image and may display the corrected display image. A drag is an operation where the user touches the screen by using the finger or the touch stylus pen and then moves the finger or the touch stylus pen to another location of the screen while touching the screen.

When the user selects the first preview image from among the preview images included in the display image, the device 100 may display an interface for selecting a size of the first preview image on the screen of the device 100. For example, the device 100 may display the interface for selecting big, medium, and small on the screen of the device 100 but is not limited thereto. The device 100 may display interfaces having various shapes for selecting the size of the first preview image on the screen of the device 100. The device 100 may receive a user input selected based on the displayed interface and may change the size the first preview image in the display image.

When the user selects the first preview image from among the preview images included in the display image, the device 100 may also display an interface for selecting a location of the first preview image on the screen of the device 100. For example, the device 100 may display the interface for selecting up, down, left, and right on the screen of the device 100 but is not limited thereto. The device 100 may display interfaces having various shapes for selecting the location of the first preview image on the screen of the device 100. The device 100 may receive a user input selected based on the displayed interface and may change the location the first preview image in the display image.

The device 100 may access an image that matches the selected preview image by using the image matching information and may perform a function provided by the device 100 on the image that matches the selected preview image. For example, when the device 100 selects the first preview image, the device 100 may access an image that matches the firm preview image by using a file path described in the image matching information and may perform the function provided by the device 100 on the image that matches the first preview image. The function provided by the device 100 may include deleting, copying, sharing, or correcting but is not limited thereto. The device 100 may provide various functions.

The device 100 may also correct the display image based on a result of performing the function and may display the corrected display image. For example, when the device 100 deletes the image that matches the first preview image, the device 100 may display the display image from which the first preview image is deleted.

Figure 3:
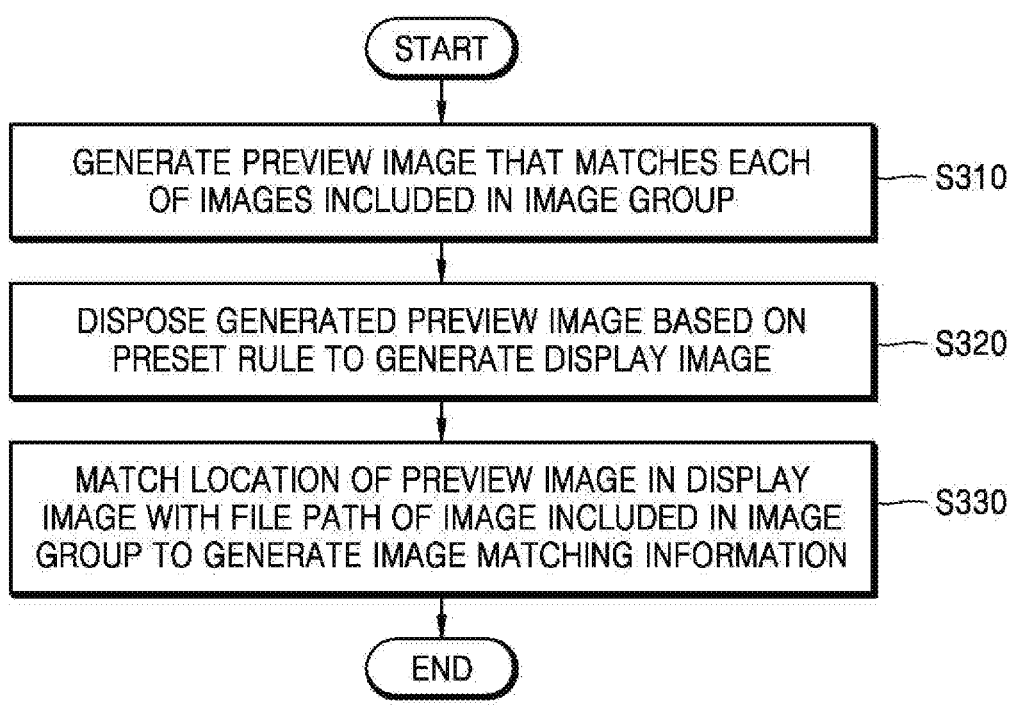
FIG. 3 is a flowchart for describing a method in which a device generates a display image, according to an embodiment of the present disclosure.

FIG. 3 is a flowchart for describing a method in which a device generates a display image, according to an embodiment of the present disclosure.

In operation S310, the device 100 may generate a preview image that matches each of the images included in an image group. For example, the device 100 may generate the preview image by capturing a main part of an image. The device 100 may also generate the preview image by reducing a pixel number of the image.

The device 100 may set the importance with respect to each of the images included in the image group. For example, the device 100 may set importance of the images by using a user input, a time when the images are obtained, sources of the images, or pixel numbers of the images, etc. but is not limited thereto. The device 100 may set the importance of the images by using various methods. For example, the device 100 may display an interface for selecting the importance of the image and may receive a user input with respect to the displayed interface to set the importance of the image. The device 100 may set a high importance to a recently obtained image on a time sequence basis among the images included in the image group.

The device 100 may determine an important region of the image. For example, the device 100 may determine the important region of the image by using a user input, a distribution of pixel values, or an important region determination algorithm but is not limited thereto. The device 100 may determine the important region by using various methods. For example, the device 100 may use the important region determination algorithm to recognize a human face in the image and may determine the recognized human face as the importance region. The device 100 may also display an interface for determining the important region and may receive a user input with respect to the displayed interface to determine the important region.

The device 100 may generate the preview image based on the determined important region. For example, when the human face is determined as the important region in the image, the device 100 may generate the preview image by processing the image in relation to the human face.

The device 100 may generate the preview image by using various methods other than the methods described above.

In operation S320, the device 100 may dispose the generated preview image based on a preset rule.

The device 100 may split a screen of the device 100 into a plurality of regions so as to generate the display image. For example, the device 100 may use a triangle, a square, a circle, or a pentagon to split the screen of the device 100 into the plurality of regions but is not limited thereto.

The device 100 may use a combination of polygons to split the screen of the device 100 into the plurality of regions. For example, the device 100 may use a combination of a square and a triangle to split the screen of the device 100 into the plurality of regions.

The device 100 may also split the screen of the device 100 into the plurality of regions in various shapes. For example, the device 100 may split the screen of the device 100 into the plurality of regions in a collage form.

The device 100 may dispose a preview image generated with respect to each of the split screens to generate the display image. For example, when X images are included in the image group, the device 100 may split the screen into X regions and may match the preview image with respect to each image included in the image group with the split region to generate the display image.

The device 100 may determine importance with respect to each of the images included in the image group. For example, the device 100 may determine the importance of the images based on a preset importance with respect to each of the images.

The device 100 may dispose a preview image of the image that is determined to be important in a relatively center region among the split regions to generate the display image. For example, the device 100 may dispose a preview image that matches an image that is set to be relatively more important among the images in the relatively center region among the plurality of split regions to generate the display image. The device 100 may also dispose the preview image that matches the image that is set to be relatively more important among the images in a region having a relatively big size among the plurality of split regions to generate the display image.

The device 100 may determine a size of a region in which the preview image is to be disposed based on a user input. For example, when the user selects the image included in the image group, the device 100 may display an interface for selecting a size of a region in which a preview image of the image group including the selected image is to be disposed as big, medium, and small on the screen of the device 100 but is not limited thereto. The device 100 may display interfaces having various shapes for selecting the size of the region in which the preview image of the image selected by the user is to be disposed on the screen of the device 100. The device 100 may receive a user input selected based on the displayed interface to determine the size of the region in which the preview image is to be disposed and may dispose the preview image based on the determined size to generate the display image.

The device 100 may also determine a location of the region in which the preview image is to be disposed based on a user input. For example, when the user selects the image included in the image group, the device 100 may display an interface for selecting a location of a region in which a preview image of the selected image is to be disposed as left, right, up, down, or center but is not limited thereto. The device 100 may display interfaces having various shapes for selecting the location of the region in which the preview image of the image selected by the user is to be disposed on the screen of the device 100. The device 100 may receive a user input selected based on the displayed interface to determine the location of the region in which the preview image is to be disposed and may dispose the preview image based on the determined location to generate the display image.

The device 100 may store the generated display image.

In operation S330, the device 100 may match a location of the preview image in the display image with a file path of the image included in the image group to generate image matching information. For example, the device 100 may match a location of a first preview image included in the display image with a path of storing a first image. For example, when the location of the first preview image included in the display image is (X, Y), the device 100 may generate the image matching information by using (X, Y) and a storage path (/sdcard/images/1.jpg) of an image that matches the first preview image.

Figure 4:
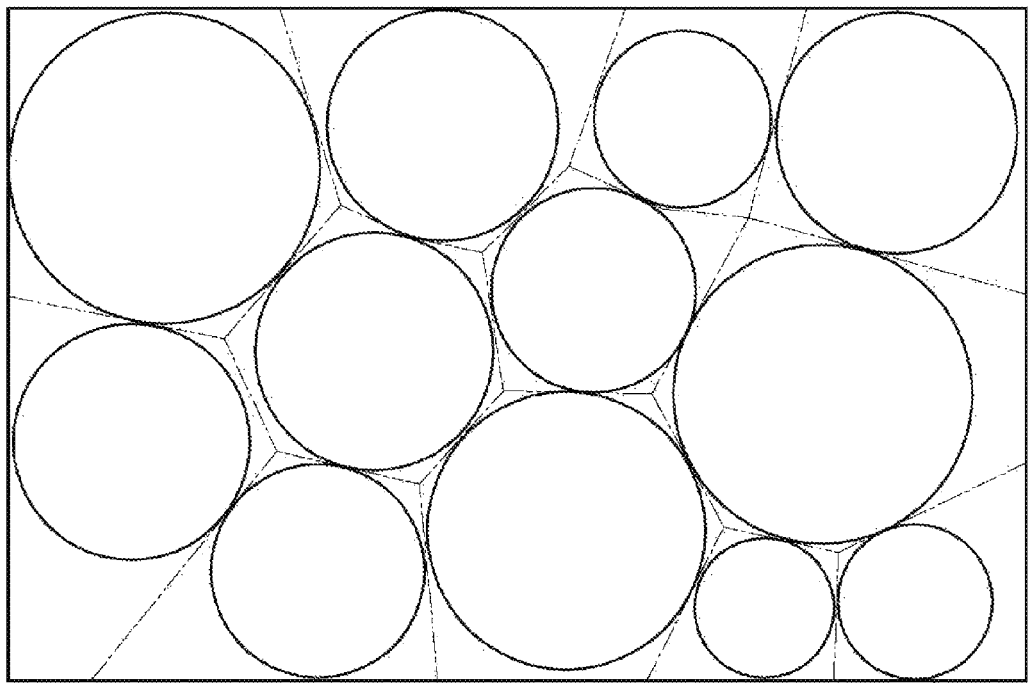
FIG. 4 is a diagram for describing a method in which a device generates a display image, according to an embodiment of the present disclosure.
Figure 4:
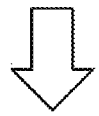
Figure 4:
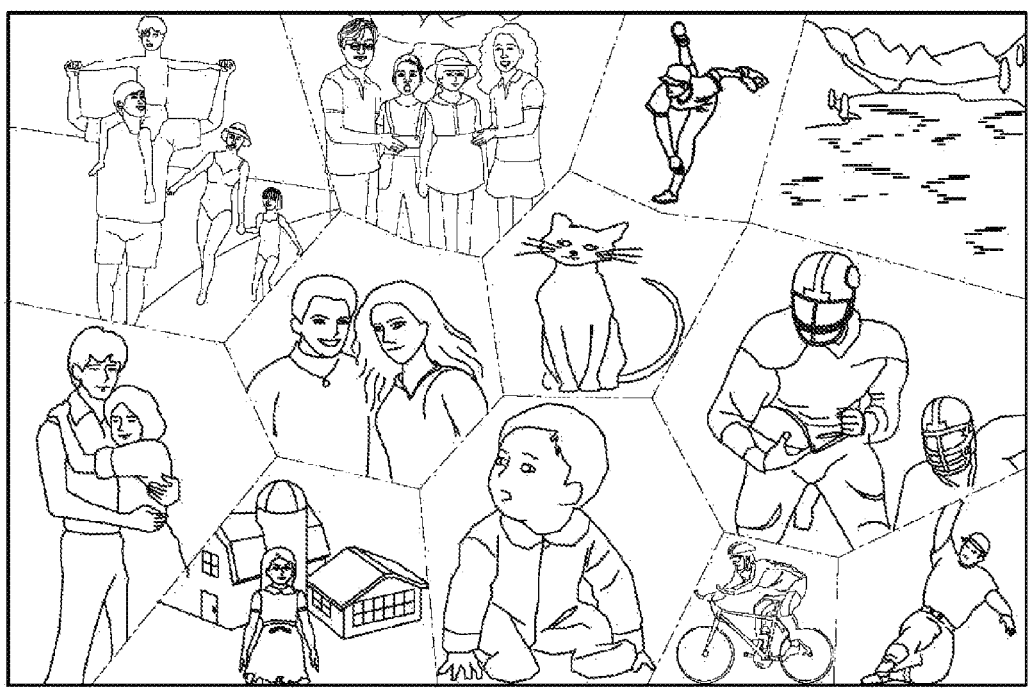

FIG. 4 is a diagram for describing a method in which a device generates a display image, according to an embodiment of the present disclosure.

The device 100 may split a screen of the device 100 into regions of a number of images included in an image group. For example, the device 100 may split the screen of the device 100 into the regions of the number of images included in the image group by using circles of various sizes.

Referring to FIG. 4, the device 100 may split the screen of the device 100 by using a plurality of circles having various sizes and tangent lines of the circles.

The device 100 may also dispose generated preview images on the split screens. Referring to FIG. 4, the device 100 may dispose the preview image on each of the split screens by using the plurality of circles and the tangent lines.

The device 100 may dispose the preview images on the split screens based on importance set to the images. For example, the device 100 may dispose a preview image that matches an image that is set to be relatively more important among the images in a region having a relatively big size among the plurality of images to generate the display image.

The device 100 may store the image in which the preview image is disposed as the display image.

Figure 5A:
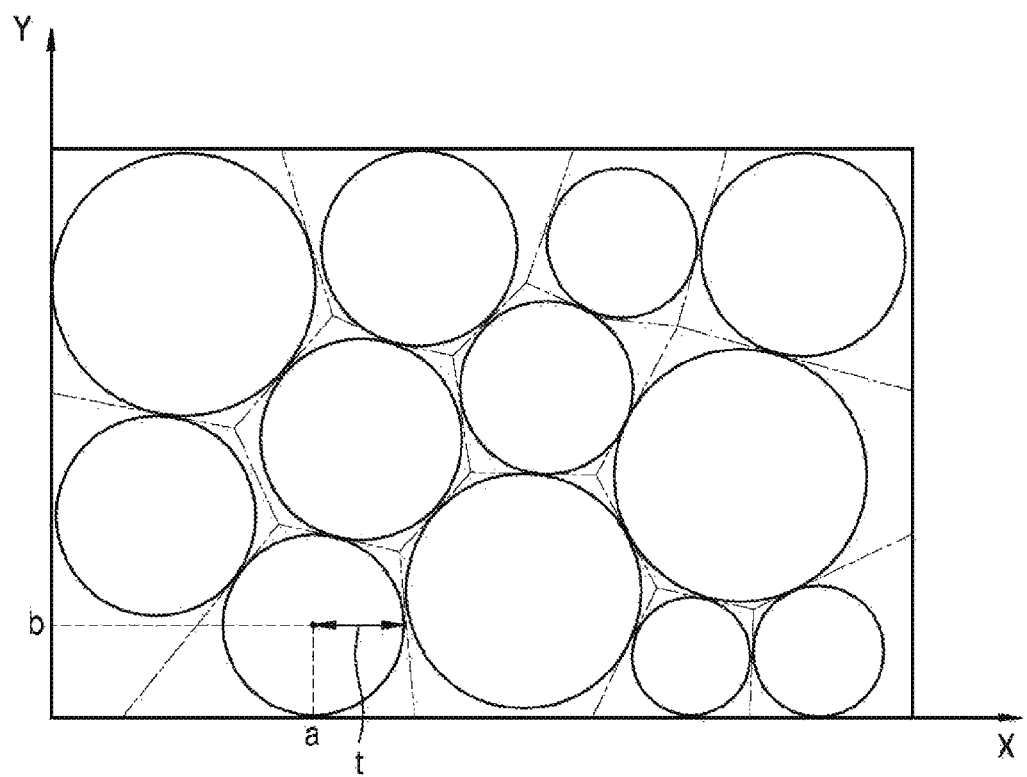

FIGS. 5A and 5B are diagrams for describing a method in which a device matches a location of a preview image in a display image with a file path of an image that matches the preview image and generates image matching information according to an embodiment of the present disclosure.

The display image stored in the device 100 may be split into a plurality of regions. For example, the display image may be split into circles of various sizes.

The device 100 may generate coordinates with respect to the plurality of regions of the display image. For example, the device 100 may generate the coordinates with respect to the plurality of regions of the display image by using a globular coordinate system or an orthogonal coordinate system but is not limited thereto.

FIG. 5A shows an example of a display image generated by splitting the display image into a plurality of regions by using circles of various sizes.

Referring to FIG. 5A, the device 100 may generate coordinates with respect to the plurality of regions included in the display image by using an orthogonal coordinate system. For example, when the display image is split into the circles of various sizes, the device 100 may generate a coordinate of a middle point of a specified circle measured in relation to a lower left side of the display image as a coordinate of a specified region. In FIG. 5A, setting of the lower left side as a coordinate measurement reference is merely an example. The coordinate measurement reference is not limited to the lower left side of the display image.

When the display image is split into the circles of various sizes, the device 100 may measure a radius of a specific circle. The measured radius may be stored.

When the display image is split into the circles of various sizes, the device 100 may match the measured radius of the circle, the measured coordinate of the middle point of the specified circle, and a file path of an image that matches a preview image disposed in the specified circle to generate image matching information.

FIG. 5B shows an example of the generated image matching information. With respect to images included in an image group in the device 100, the device 100 may generate the image matching information shown in FIG. 5B. An item of the image matching information shown in FIG. 5B is merely an embodiment of the present disclosure and is not limited thereto.

Figure 6:
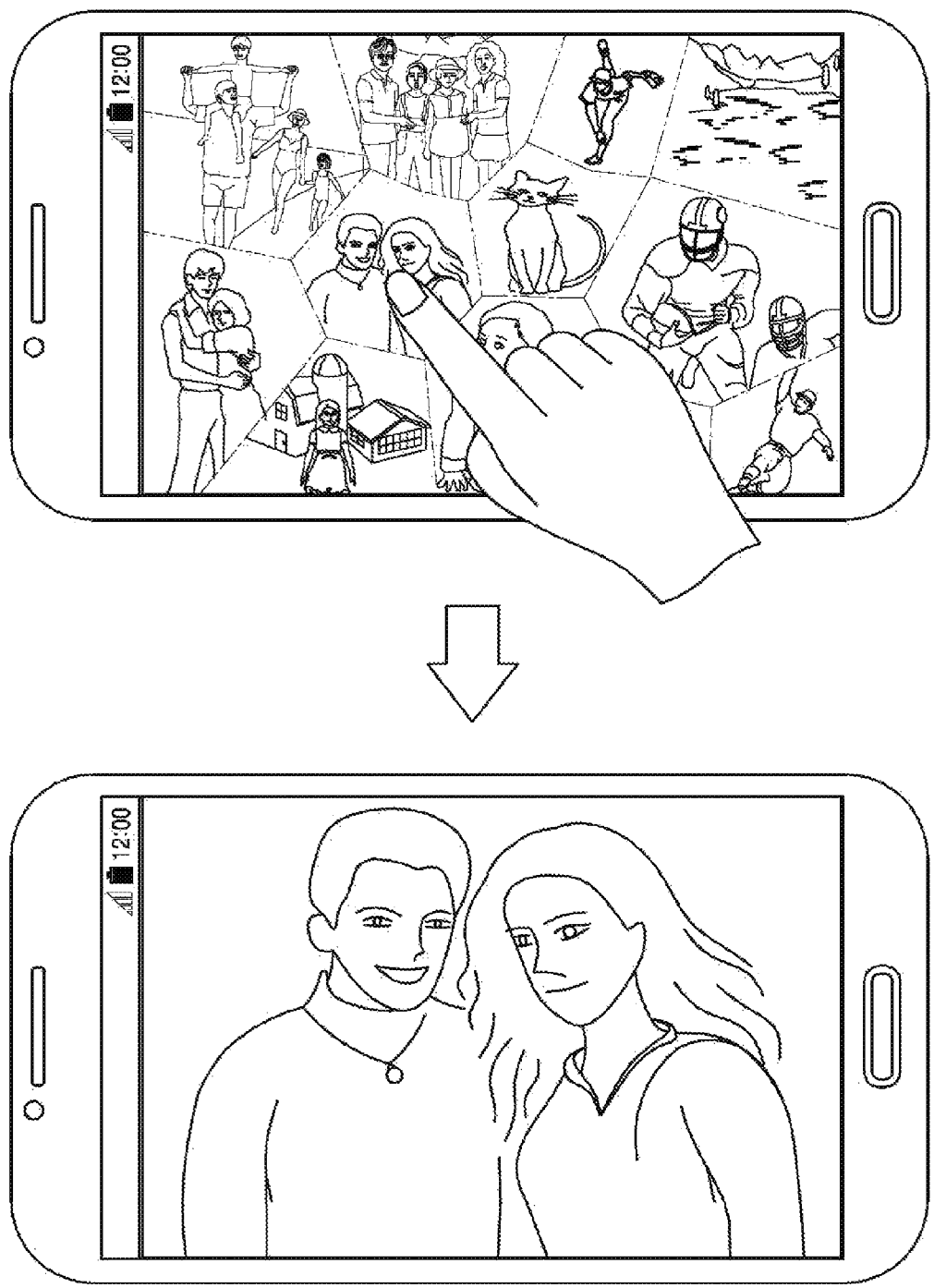
FIG. 6 is a diagram for describing a method in which a device selects a preview image from a display image and accesses the selected preview image, according to an embodiment of the present disclosure.

FIG. 6 is a diagram for describing a method in which a device selects a preview image from a display image and accesses the selected preview image, according to an embodiment of the present disclosure.

The device 100 may select at least one preview image included in the display image based on a user input. For example, the device 100 may receive a tap input of a user and may select a preview image that matches a location of the received tap input in the display image.

The device 100 may access an image that matches the selected preview image by using image matching information.

For example, referring to FIG. 6, the device 100 may select a first preview image based on the user input and may open a first image that matches the first preview image by using a file path described in stored image matching information.

For example, when the user double taps the preview image, the device 100 may open an image that matches the preview image based on the image matching information. A double tap means an operation where the user quickly touches a screen twice by using a finger or a touch stylus pen.

Figure 7:
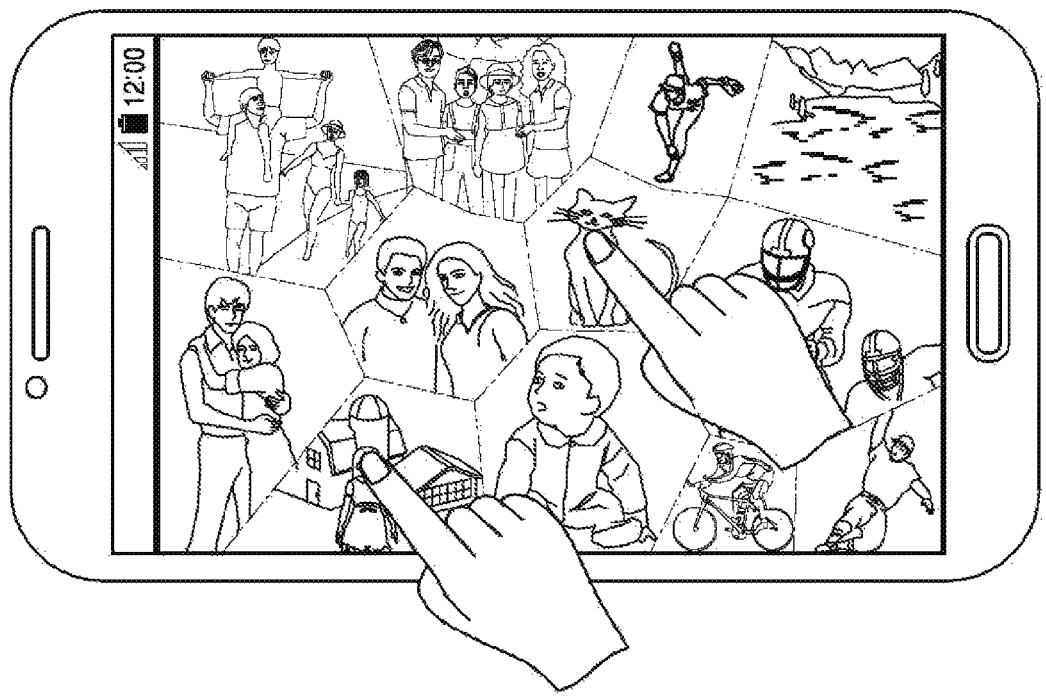
FIG. 7 is a diagram for describing a method in which a device selects a preview image from a display image and performs a function provided by a device on an image that matches the selected preview image, according to an embodiment of the present disclosure.
Figure 7:
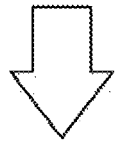
Figure 7:
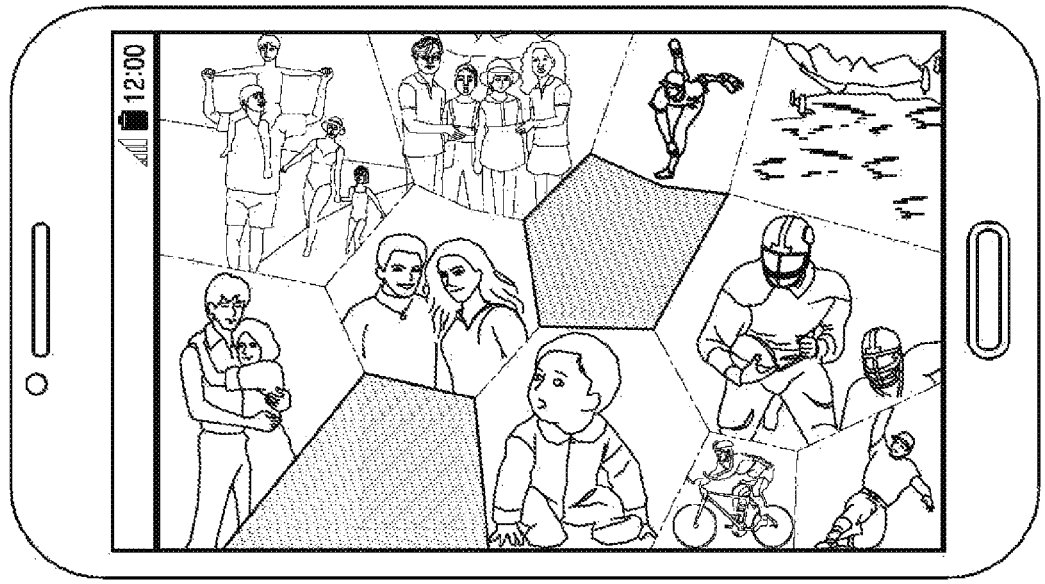

FIG. 7 is a diagram for describing a method in which a device selects a preview image from a display image and performs a function provided by the device 100 on an image that matches the selected preview image according to an embodiment of the present disclosure.

The device 100 may select at least one preview image included in the display image based on a user input. For example, the device 100 may receive a tap input of a user and may select a preview image that matches a location of the received tap input in the display image.

The device 100 may access the image that matches the selected preview image by using image matching information and may perform the function provided by the device 100 on the image that matches the selected preview image.

For example, referring to FIG. 7, the device 100 may select a first preview image and a second preview image based on a user input and may access a first image that matches the first preview image and a second image that matches the second preview image by using a file path described in the stored image matching information.

The device 100 may perform the function provided by the device 100 on the image that matches the selected preview image based on the user input. The function provided by the device 100 may include deleting, copying, sharing, or correcting but is not limited thereto. The device 100 may provide various functions.

For example, referring to FIG. 7, the device 100 may access the first image that matches the first preview image and the second image that matches the second preview image based on the stored image matching information and may delete the first image and the second image based on the user input.

The device 100 may correct the display image based on a result of performing the function and may display the corrected display image. For example, when the device 100 deletes the first image that matches the first preview image and the second image that matches the second preview image, the device 100 may display the display image from which the first preview image and the second preview image are deleted.

Figure 8:
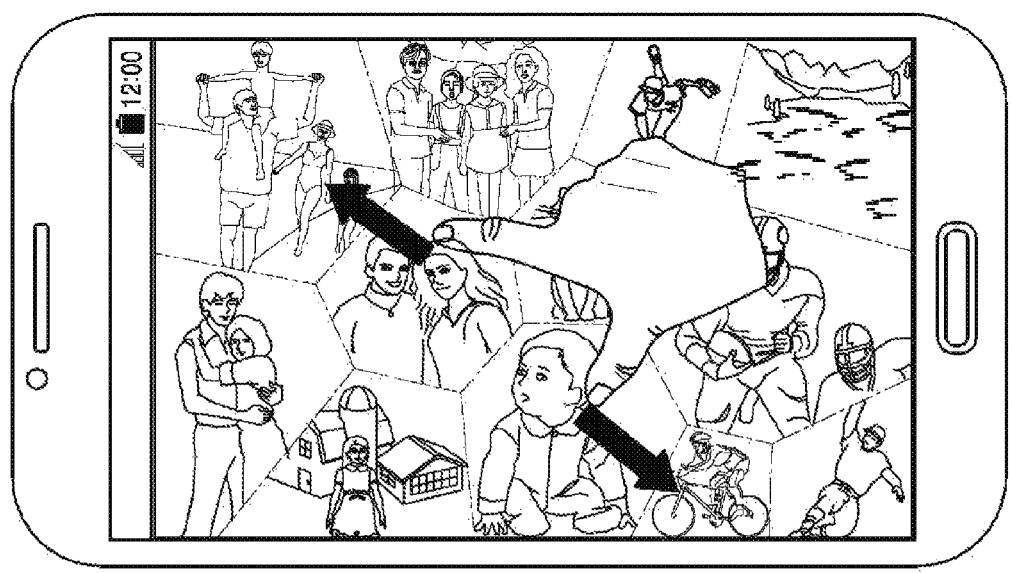
FIG. 8 is a diagram illustrating a method in which a device displays a display image based on a user input, according to another embodiment of the present disclosure.
Figure 8:
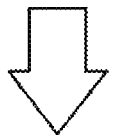
Figure 8:
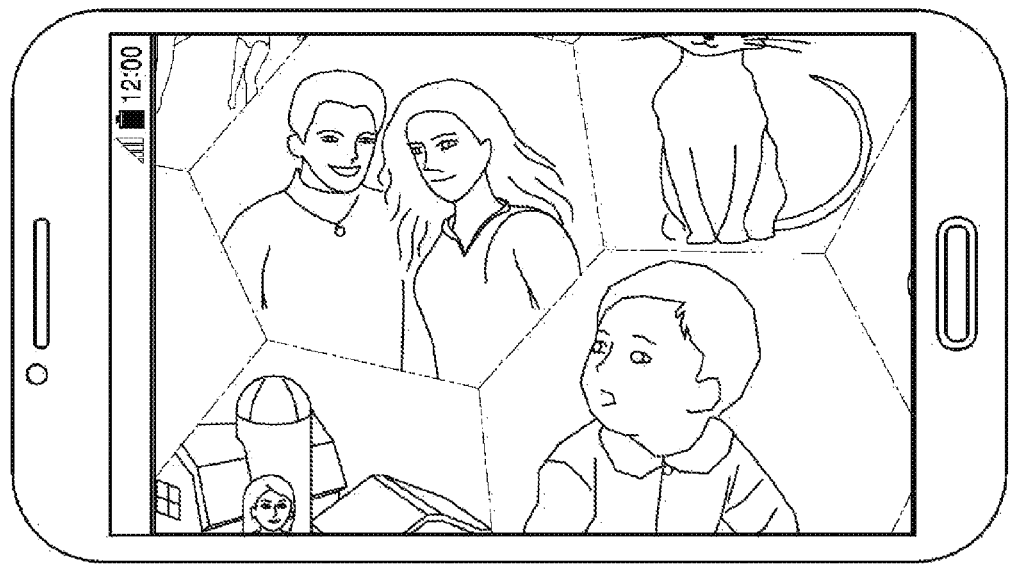

FIG. 8 is a diagram illustrating a method in which a device displays a display image based on a user input, according to another embodiment of the present disclosure.

The device 100 may display the display image based on the user input using various methods. For example, referring to FIG. 8, when the device 100 receives a pinching input of a user, the device 100 may zoom in and display the display image. A pinch means an operation where the user touches a screen by using the fingers or touch stylus pens and then widens or narrows a gap between the fingers or the touch stylus pens. An operation where the user touches the screen by using two or more fingers and then widens a gap between the fingers is referred to as unpinching, and narrows the gap therebetween is referred to as pinching.

When the device 100 receives an unpinching input from the user, the device 100 may zoom out and display the display image.

Figure 9:
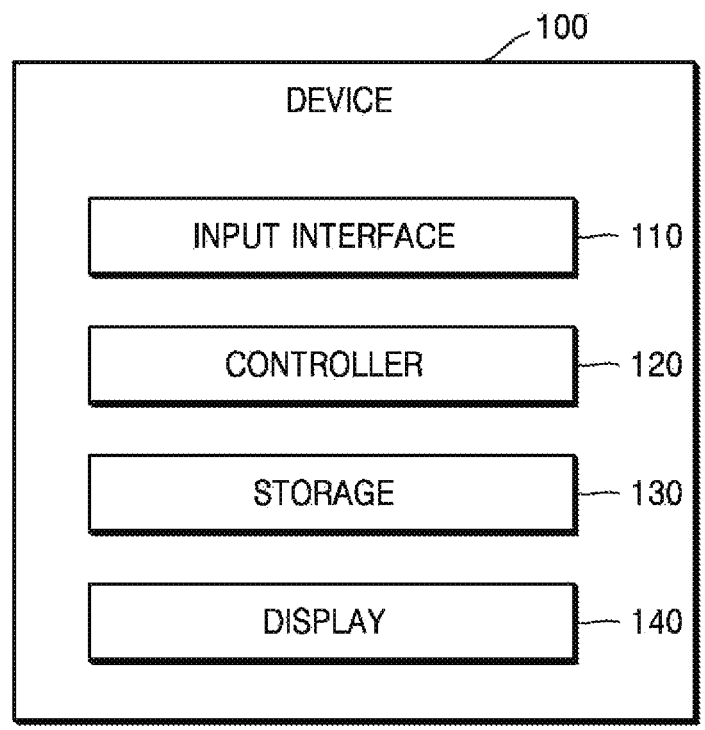
FIG. 9 is a block diagram for describing a device according to an embodiment of the present disclosure.

FIG. 9 is a block diagram for describing a device according to an embodiment of the present disclosure.

The device 100 may include an input interface 110, a controller 120, a storage 130, and a display 140. The input interface 110, the controller 120, the storage 130, and the display 140 may be implemented as one processor, as respective processors, each as a plurality of processors. However, the input interface 110, the controller 120, the storage 130, and the display 140 are not limited thereto and may be implemented in various other ways.

The device 100 may obtain a plurality of images. For example, the device 100 may obtain an image from an external device and may obtain an image from a camera module included in the device 100 but is not limited thereto. The device 100 may obtain an image by using various methods.

The controller 120 of the device 100 may generate an image group. The controller 120 of the device 100 may group the plurality of images by using various references to generate a plurality of image groups. For example, the controller 120 of the device 100 may group images based on a time when the images are obtained. The controller 120 of the device 100 may also group the images based on a user input, sources of the images, capacity of the images, a preset rule, or a combination of these but is not limited thereto.

The controller 120 of the device 100 may generate a preview image with respect to each of a plurality of images included in the image group. For example, the controller 120 of the device 100 may generate the preview image by capturing a main part of an image. The controller 120 of the device 100 may also generate the preview image by reducing a pixel number of the image.

The controller 120 of the device 100 may set the importance with respect to each of the images included in the image group. For example, the controller 120 of the device 100 may set the importance of the images by using a user input, a time when the images are obtained, sources of the images, or pixel numbers of the images, etc. but is not limited thereto. The controller 120 of the device 100 may set the importance of the images by using various methods. For example, the controller 120 of the device 100 may display an interface for selecting the importance of the image and may receive a user input with respect to the displayed interface to set the importance of the image. The controller 120 of the device 100 may set a high importance to a recently obtained image on a time sequence basis among the images included in the image group.

The controller 120 of the device 100 may determine importance with respect to each of the images included in the image group. For example, the controller 120 of the device 100 may determine the importance of the images based on a preset importance with respect to each of the images.

The controller 120 of the device 100 may dispose a preview image of the image that is determined to be important in a relatively center region among split regions to generate the display image. For example, the controller 120 of the device 100 may dispose a preview image that matches an image that is set to be relatively more important among the images in the relatively center region among a plurality of split regions to generate the display image. The controller 120 of the device 100 may also dispose the preview image that matches the image that is set to be relatively more important among the images in a region having a relatively big size among the plurality of split regions to generate the display image.

The controller 120 of the device 100 is not limited thereto and may generate the preview image by using various methods.

The controller 120 of the device 100 may split a screen of the device 100 into a plurality of regions to generate the display image. For example, the controller 120 of the device 100 may use a triangle, a square, a circle, or a pentagon to split the screen of the device 100 into the plurality of regions but is not limited thereto.

The controller 120 of the device 100 may use a combination of polygons to split the screen of the device 100 into the plurality of regions. For example, the controller 120 of the device 100 may use a combination of a square and a triangle to split the screen of the device 100 into the plurality of regions.

The controller 120 of the device 100 may also split the screen of the device 100 into the plurality of regions in various shapes. For example, the controller 120 of the device 100 may split the screen of the device 100 into the plurality of regions in a collage form.

The controller 120 of the device 100 may dispose a preview image generated with respect to each of the split screens to generate the display image. For example, when X images are included in the image group, the controller 120 of the device 100 may split the screen into X regions and may match the preview image with respect to each image included in the image group with the split region to generate the display image.

The controller 120 of the device 100 may determine importance with respect to each of the images included in the image group. For example, the controller 120 of the device 100 may determine the importance of the images based on a preset importance with respect to each of the images.

The controller 120 of the device 100 may dispose a preview image of the image that is determined to be important in a relatively center region among the split regions to generate the display image. For example, the controller 120 of the 100 may dispose a preview image that matches an image that is set to be relatively more important among the images in the relatively center region among the plurality of split regions to generate the display image. The controller 120 of the device 100 may also dispose the preview image that matches the image that is set to be relatively more important among the images in a region having a relatively big size among the plurality of split regions to generate the display image.

The controller 120 of the device 100 may determine a size of a region in which the preview image is to be disposed based on a user input. For example, when the user selects the image included in the image group, the controller 120 of the device 100 may control the device 100 to display an interface for selecting a size of a region in which a preview image of the image group including the selected image is to be disposed as big, medium, and small on the display 140 of the device 100 but is not limited thereto. The controller 120 of the device 100 may control the device 100 to display interfaces having various shapes for selecting the size of the region in which the preview image of the image selected by the user is to be disposed on the display 140 of the device 100. The controller 120 of the device 100 may receive a user input selected based on the displayed interface to determine the size of the region in which the preview image is to be disposed and may dispose the preview image based on the determined size to generate the display image.

The controller 120 of the device 100 may also determine a location of the region in which the preview image is to be disposed based on a user input. For example, when the user selects the image included in the image group, the controller 120 of the device 100 may control the device 100 to display an interface for selecting a location of a region in which a preview image of the selected image is to be disposed as left, right, up, down, or center on the display 140 of the device 100 but is not limited thereto. The controller 120 of the device 100 may control the device 100 to display interfaces having various shapes for selecting the location of the region in which the preview image of the image selected by the user is to be disposed on the display 140 of the device 100. The controller 120 of the device 100 may receive a user input selected based on the displayed interface to determine the location of the region in which the preview image is to be disposed and may dispose the preview image based on the determined location to generate the display image.

The controller 120 of the device 100 may store the generated display image in the storage 130 of the device 100.

When the controller 120 of the device 100 generates the display image, the controller 120 of the device 100 may generate image matching information. For example, the controller 120 of the device 100 may match a location of a first preview image included in the display image with a path of storing a first image. For example, when the location of the first preview image included in the display image is (X, Y), the controller 120 of the device 100 may generate the image matching information by using (X, Y) and a storage path (/sdcard/images/1.jpg) of the first image.

The controller 120 of the device 100 may generate a plurality of display images with respect to one image group. For example, the controller 120 of the device 100 may generate the plurality of display images with respect to one image group based on the number of images included in the image group.

For example, when the number of images included in the image group is greater than a preset threshold value, the controller 120 of the device 100 may generate the plurality of display images with respect to one image group. The threshold value may be set by a user input, a preset rule, or an application installed in the device 100 but is not limited thereto. The threshold value may be set using various methods.

The controller 120 of the device 100 may periodically correct or generate the display image with respect to the image group in the device 100. For example, the controller 120 of the device 100 may correct or generate the display image based on time information set by a user, preset time information, or time information received from an external device.

For example, when the user of the device 100 sets 24 hours, the controller 120 of the device 100 may collect information regarding the plurality of images included in the image group in the device 100 every 24 hours to correct or generate the display image.

The controller 120 of the device 100 may receive the user input. For example, the controller 120 of the device 100 may receive the user input through a touch screen but is not limited thereto.

The controller 120 of the device 100 may select one of the plurality of image groups based on the user input. For example, the controller 120 of the device 100 may control to display an icon indicating the plurality of image groups and may select one of the plurality of displayed image groups based on the user input.

The controller 120 of the device 100 may search for the display image that matches the selected image group. For example, the controller 120 of the device 100 may search for the display image that matches the selected image group among display images in the device 100.

When the controller 120 of the device 100 fails to find the display image that matches the selected image group, the controller 120 of the device 100 may generate the display image with respect to the selected image group. For example, when there is no display image corresponding to the selected image group, the controller 120 of the device 100 may generate the display image in operation S210 or by using the method described with reference to FIG. 3.

When the controller 120 of the device 100 succeeds in finding the display image with respect to the selected image group, the controller 120 of the device 100 may control the device 100 to display the found display image on the display 140 of the device 100. When the controller 120 of the device 100 fails to find the display image with respect to the selected image group, the controller 120 of the device 100 may control the device 100 to generate the display image with respect to the selected image group and display the generated display image on the display 140 of the device 100.

The controller 120 of the device 100 may select at least one preview image included in the display image based on a user input. For example, the input interface 110 of the device 100 may receive a tap input of the user, and the controller 120 of the device 100 may select a preview image that matches a location of the tap input received in the display image.

The controller 120 of the device 100 may correct the display image based on the user input and may display the corrected display image. For example, when the user selects the first preview image and moves the selected first preview image to a second preview image by performing a drag input, the controller 120 of the device 100 may correct the display image to exchange locations of the first preview image and the second preview image in the display image.

The controller 120 of the device 100 may control the device 100 to display the corrected display image on the display 140 of the device 100.

When the user selects the first preview image from among the preview images included in the display image, the controller 120 of the device 100 may control the device 100 to display an interface for selecting a size of the first preview image on the display 140 of the device 100. For example, the controller 120 of the device 100 may control the device 100 to display the interface for selecting big, medium, and small on the display 140 of the device 100 but is not limited thereto. The controller 120 of the device 100 may control to display interfaces having various shapes for selecting the size of the first preview image on the display 140 of the device 100. The controller 120 of the device 100 may receive a user input selected based on the displayed interface and may change the size the first preview image in the display image.

When the user selects the first preview image from among the preview images included in the display image, the controller 120 of the device 100 may also control the device 100 to display an interface for selecting a location of the first preview image on the display 140 of the device 100. For example, the controller 120 of the device 100 may control the device 100 to display the interface for selecting up, down, left, and right on the display 140 of the device 100 but is not limited thereto. The controller 120 of the device 100 may display interfaces having various shapes for selecting the location of the first preview image on the display 140 of the device 100. The controller 120 of the device 100 may receive a user input selected based on the displayed interface and may change the location the first preview image in the display image.

The controller 120 of the device 100 may access an image that matches the selected preview image by using the image matching information and may perform a function provided by the device 100 on the image that matches the selected preview image. For example, when the user of the device 100 selects the first preview image, the controller 120 of the device 100 may access an image that matches the first preview image by using a file path described in the image matching information and may perform the function provided by the device 100 on the image that matches the first preview image.

The controller 120 of the device 100 may also control the device 100 to correct the display image based on a result of performing the function and display the corrected display image on the display 140 of the device 100.

The one or more embodiments of the present invention may be embodied as a recording medium, e.g., a program module to be executed in computers, which include computer-readable commands. The computer-readable medium may include any usable medium that may be accessed by computers, volatile and non-volatile media, and detachable and non-detachable media. Also, the computer-readable medium may include a computer storage medium and a communication medium. The computer storage medium includes all of volatile and non-volatile media, and detachable and non-detachable media which are designed to store information including computer-readable commands, data structures, program modules, or other data. The communication medium includes computer-readable commands, a data structure, a program module, and other transmission mechanisms, and includes other information transmission media.

While the present invention has been particularly shown and described with reference to exemplary embodiments thereof, it will be understood by one of ordinary skill in the art that various changes in form and details may be made therein without departing from the spirit and scope of the present invention as defined by the following claims. Hence, it will be understood that the embodiments described above are not limiting of the scope of the invention. For example, each component described in a single type may be executed in a distributed manner, and components described distributed may also be executed in an integrated form.

The scope of the present invention is indicated by the claims rather than by the detailed description of the invention, and it should be understood that the claims and all modifications or modified forms drawn from the concept of the claims are included in the scope of the present invention.

The invention claimed is:

1. A method of displaying an image, performed by a device, the method comprising:
generating a plurality of display images for a plurality of image groups in the device;
selecting a first image group among the plurality of image groups based on a first user input;
searching for a first display image matching the first image group; and
displaying the first display image,
wherein the generating step comprises:
generating a preview image corresponding to an image included in one of the plurality of image groups based on an important region of the image, and
disposing the preview image onto one of a plurality of regions on a display of the device based on a preset rule that the one of a plurality of regions in which the preview image is to be placed is determined according to an importance information set to the image included in the one of the plurality of image groups.

2. The method of claim 1, wherein the generating of the plurality of display images comprises:
generating image matching information by matching a location of the preview image, disposed in the one of the plurality of display images, with an image file path of the image that corresponds to the generated preview image.

3. The method of claim 2, wherein the generating of the preview image comprises:
determining an important region of the image included in the one of the plurality of image groups; and
generating the preview image by processing the image in relation to the determined important region.

4. The method of claim 1, further comprising:
selecting the preview image included in the displayed display image based on a second user input;
performing a function provided by the device on the image that matches the selected preview image; and
adjusting the display image by including a result of performing the function; and
displaying the adjusted display image.

5. The method of claim 4, wherein the performing step comprises:
using image matching information included in the device.

6. The method of claim 1, wherein the searching step comprises:
when the first display image is not found, generating a second display image with respect to the first image group, and
displaying the second display image.

7. A device comprising:
at least one processor configured to:
- generate a plurality of display images for a plurality of image groups in the device,
- select a first image group among the plurality of image groups based on a first user input, and
- search for a first display image matching the first image group;

an input interface configured to receive the first user input; and a display configured to display the first display image, wherein the at least one processor further configured to:
- generate a preview image corresponding to an image included in one of the plurality of image groups based on an important region of the image, and
- dispose the preview image onto one of a plurality of regions on the display of the device based on a preset rule that a size of a region in which the preview image is to be placed is determined according to an importance information set to the image included in the one of the plurality of image groups.

8. The device of claim 7, wherein the at least one processor is further configured to:
- generate image matching information by matching a location of the disposed preview image in the one of the plurality of display images with an image file path of the image that corresponds to the generated preview image.

9. The device of claim 7, wherein the at least one processor is further configured to:
- determine an important region of the images included in the one of the plurality of image groups, and
- generate the preview image by processing the image in relation to the determined important region.

10. The device of claim 7, wherein the at least one processor is further configured to:
- select the preview image included in the displayed display image based on a second user input received from the input interface,
- perform a function provided by the device on the image that matches the preview image, and
- adjust the display image by including a result of performing the function, wherein the display displays the adjusted display image.

11. The device of claim 10, wherein the at least one processor is further configured to use image matching information included in the device.

12. The device of claim 7,
wherein the at least one processor is further configured to generate, when the first display image matching the first image group is not found, a second display image with respect to the first image group, and
control the display to display the generated display image.

13. A non-transitory computer-readable recording medium having recorded thereon a computer program for executing the method of claim 1.

14. The method of claim 1, wherein the image is determined based on at least one of times when the image is obtained, a user input, sources of the image, or a preset rule.

15. The device of claim 7, wherein the image is determined based on at least one of times when the image is obtained, a user input, sources of the image, or a preset rule.

16. The method of claim 1, wherein the generating of the display image comprises:
- splitting a display into a plurality of regions; and
- disposing the preview image in one of the plurality of regions.

17. The device of claim 7, wherein the at least one processor is further configured to:
- split the display into a plurality of regions, and
- dispose the preview image in one of the plurality of regions.

* * * * *